United States Patent

Haddad

[11] Patent Number: 5,879,108
[45] Date of Patent: Mar. 9, 1999

[54] AIR SPARGING/SOIL VAPOR EXTRACTION APPARATUS

[75] Inventor: John A. Haddad, Ypsilanti, Mich.

[73] Assignee: Eder Associates, Locust Valley, N.J.

[21] Appl. No.: 871,240

[22] Filed: Jun. 9, 1997

[51] Int. Cl.[6] .............................. B09C 1/00; C02F 1/20; F21B 43/14

[52] U.S. Cl. .................... 405/128; 166/306; 166/313; 166/370; 166/372; 210/170; 210/747

[58] Field of Search ................................. 166/306, 313, 166/369, 370, 372, 227; 210/170, 747; 405/128, 52

[56] References Cited

U.S. PATENT DOCUMENTS

| | | | |
|---|---|---|---|
| 3,055,423 | 9/1962 | Parker | 166/306 X |
| 3,066,732 | 12/1962 | McEver | 166/306 X |
| 4,124,253 | 11/1978 | Latiolais et al. . | |
| 4,625,801 | 12/1986 | McLaughlin et al. . | |
| 4,671,351 | 6/1987 | Rappe . | |
| 4,678,040 | 7/1987 | McLaughlin et al. . | |
| 4,846,936 | 7/1989 | Carberry . | |
| 4,978,508 | 12/1990 | Hansen et al. . | |
| 4,988,389 | 1/1991 | Adamache et al. . | |
| 5,095,975 | 3/1992 | Bernhardt . | |
| 5,116,163 | 5/1992 | Bernhardt . | |
| 5,143,606 | 9/1992 | Bernhardt | 210/170 |
| 5,220,958 | 6/1993 | Bernhardt . | |
| 5,304,704 | 4/1994 | Kammeraad . | |
| 5,318,698 | 6/1994 | Bernhardt . | |
| 5,337,828 | 8/1994 | Jennings, Jr. | 166/372 |
| 5,348,420 | 9/1994 | Bernhardt | 405/52 |
| 5,389,267 | 2/1995 | Gorelick et al. | 210/170 X |
| 5,398,757 | 3/1995 | Corte et al. . | |
| 5,402,848 | 4/1995 | Kelly | 166/266 |
| 5,509,757 | 4/1996 | Croy . | |
| 5,577,558 | 11/1996 | Abdul et al. . | |
| 5,620,593 | 4/1997 | Stagner | 210/170 X |
| 5,622,450 | 4/1997 | Grant, Jr. | 405/128 |

Primary Examiner—George Suchfield
Attorney, Agent, or Firm—Young & Basile, PC

[57] ABSTRACT

An in situ air sparging/soil vapor extraction apparatus includes first, second and third concentrically arranged pipes disposed in a single bore hole. The first pipe extends a first length through the bore hole to discharge pressurized gas from a second end. The second pipe surrounds the first pipe and extends a second distance, less than the first length of the first pipe, through the bore hole to discharge pressurized gas from the second end of the second pipe at a different level in the soil then the pressurized gas discharged from the second end of the first pipe. The third pipe surrounds the second pipe and is connected to a low pressure source to extract substantially all of the air discharged through the second ends of the first and second pipes and the contaminants entrained in the air from the soil and groundwater.

12 Claims, 3 Drawing Sheets

AIR SPARGING/SOIL VAPOR EXTRACTION APPARATUS

BACKGROUND OF THE INVENTION

1. Field of the Invention

The present invention relates, in general, to soil and groundwater remediation apparatus and processes and, more specifically, to air sparging/soil vapor extraction apparatus and processes.

Concerted efforts have been made to remove contaminants from soil and ground water. A common method is in situ air sparging and soil vapor extraction using pressurized air injection through a bore hole in contaminated soil. The pressurized air volatizes and entrains contaminants in the groundwater in close proximity to the discharge outlet of the injection bore hole. An extraction bore hole is spaced from the injection bore hole and has a low pressure or vacuum to draw the pressurized air and entrained contaminants from the groundwater. This withdrawn air is filtered in a surface located processing facility to remove the contaminants.

However, such an apparatus and process suffers from several deficiencies. First, since the injection bore hole or holes are spaced from the extraction bore hole, only a percentage of the injected air from the bore hole is captured and withdrawn through the extraction bore hole. Secondly, the injection bore holes are typically of one constant depth. As the injected air exits the injection bore hole, and entrains contaminants therein, the air becomes saturated as it rises through the soil until it is incapable of volatizing additional contaminants. Thus, in this typical prior art arrangement, only the contaminants in the immediate vicinity of the outlet of the injection bore hole are volatized. It will normally take a considerable length of time before all the contaminants in the immediate vicinity of the discharge outlet of the injection bore hole are remediated so as to enable air discharged from the injection bore hole to rise and begin volatizing contaminants located at closer to the surface. This adds additional time to and lowers the efficiency of the soil and groundwater remediation process.

Thus, it would be desirable to provide an air sparging/soil vapor extraction apparatus and method which insures that substantially all of the air injected through the injection bore is collected by the extraction bore hole. It would also be desirable to provide an air sparging/soil vapor extraction apparatus and method which is capable of simultaneously removing contaminants at different levels within the soil and groundwater. Finally it would also be desirable to provide an air sparging/soil vapor extraction apparatus and method which reduces the number of bore holes required to remediate a contaminated area.

SUMMARY OF THE INVENTION

The present invention is an air sparging/soil vapor extraction apparatus and method. The inventive apparatus is mounted in a bore hole extending through soil. First, second and third concentric pipes are disposed within the bore hole, with each pipe having opposed first and second ends. The first pipe extends a first distance through the bore hole to the second end and is connected at the first end to a pressurized gas or air source so as to the discharge pressurized gas from the second end of the first pipe. The second pipe surrounds the first pipe and extends a second distance through the bore hole. The second distance is less than the first distance or length of the first pipe. The first end of the second pipe is connected to a source of pressurized gas to discharge gas from the second end of the second pipe. The third conduit surrounds the second conduit and extends a third distance through the soil. The third distance is less than the second distance or length of the second conduit. The first end of the third conduit is connected to a low pressure source to draw gas discharged from the first and second pipes into the second end of the third pipe.

In a preferred embodiment, the second end of the first pipe is located deep below the water table level, the second end of the second pipe is disposed immediately below the water table level in the soil. The second end of the third pipe is preferably disposed above the water table level.

A cap closes the second end of the second pipe and centers the first pipe within the second end of the second pipe. Similarly, a cap closes the second end of the third pipe and centers the second pipe therein.

The present invention also provides a unique method for remediating soil and groundwater of volatile contaminants. The inventive method comprises the steps of:

providing first, second and third concentric pipes, each having opposed first and second ends;

extending the first pipe a first distance through a bore hole to the second end;

connecting the first end of the first pipe to a pressurized gas or air source for the discharge of pressurized gas from the second end of the first pipe;

disposing the second pipe concentrically about the first pipe; and extending the second pipe a second distance through the bore hole, the second distance being less than the first distance of the first pipe through the bore hole;

connecting the first end of the second pipe to a pressurized gas or air source for the discharge of pressurized gas from the second end of the second pipe;

disposing the third pipe concentrically about the second pipe;

extending the third pipe a third distance through the bore hole, the third distance being less than the second distance of the second pipe through the bore hole; and connecting the first end of the third pipe to a low pressure source to extract pressurized air from the soil immediately surrounding the bore hole.

The method further comprises the steps of injecting the gas into the first pipe at a higher pressure than the pressure of the gas injected into the second pipe. Further, the method includes the step of selecting a length for the second pipe so as to position the second end of the second pipe below, but in close proximity to the water table level in the soil in which the bore hole is formed. The length of the third pipe is selected so as to position the second end the third pipe above water table level in the soil.

The unique air sparging/soil vapor extraction apparatus and method of the present invention provides significant advantages over previously devised soil and groundwater remediation apparatus and processes. First, the present apparatus utilizes a single bore hole for both air sparging and soil vapor extraction. The concentric arrangement of pressurized gas injection pipes and the extraction pipe simplifies installation and reduces set up costs; while at the same time insuring the substantially all of the pressurized gas injected through the injection pipes is collected by the extraction pipe. Further, the concentric arrangement of injection and extraction pipes insures that all of the air injected through the injection pipes, after volatizing contaminants within the soil, is collected by the extraction pipe for highly efficient and complete soil and groundwater remediation. This also reduces the total length of time required to completely remediate a contaminated area.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
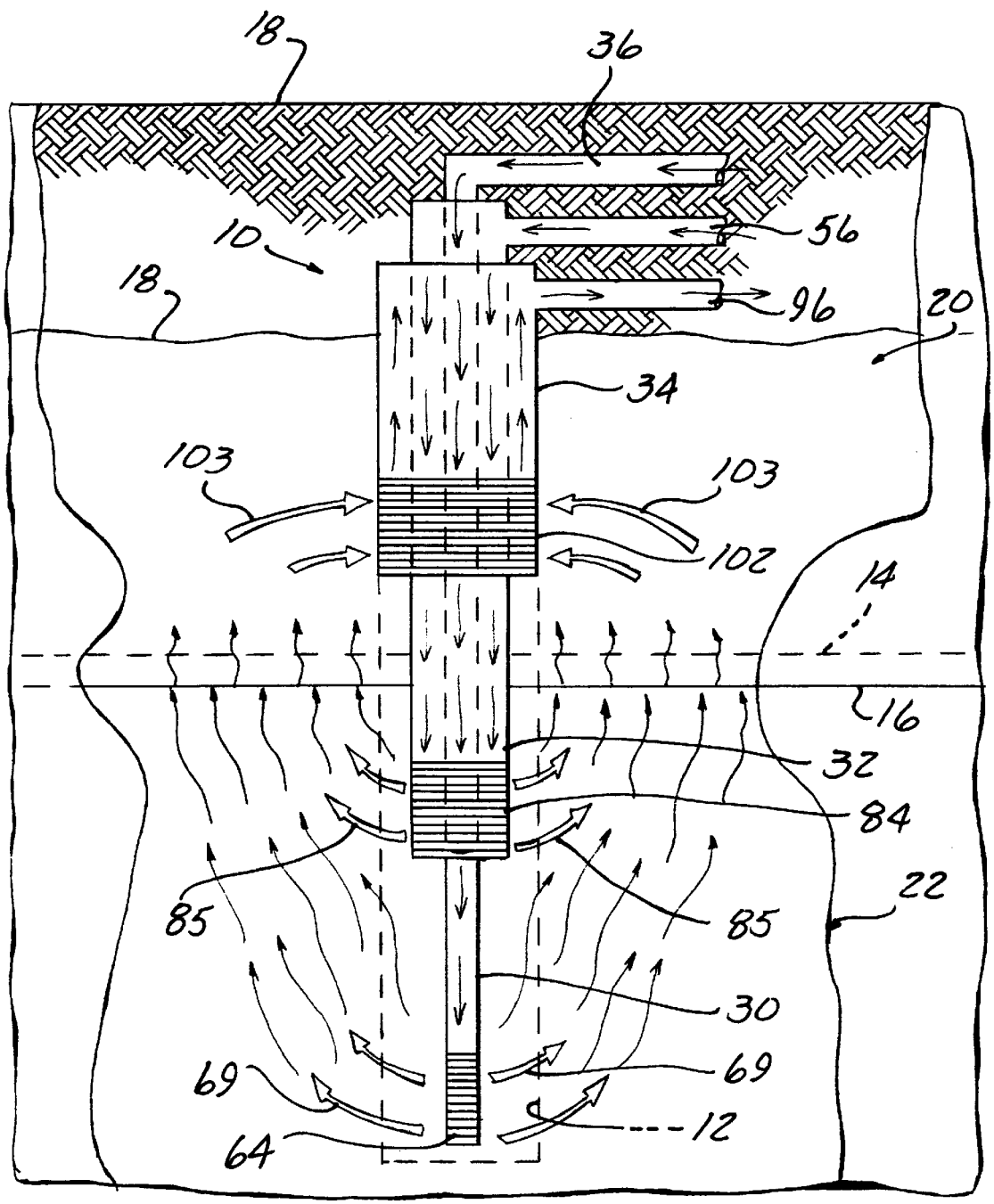
FIG. 1 is a pictorial representation of an air sparging/soil vapor extraction apparatus according to the present invention.
Figure 2:
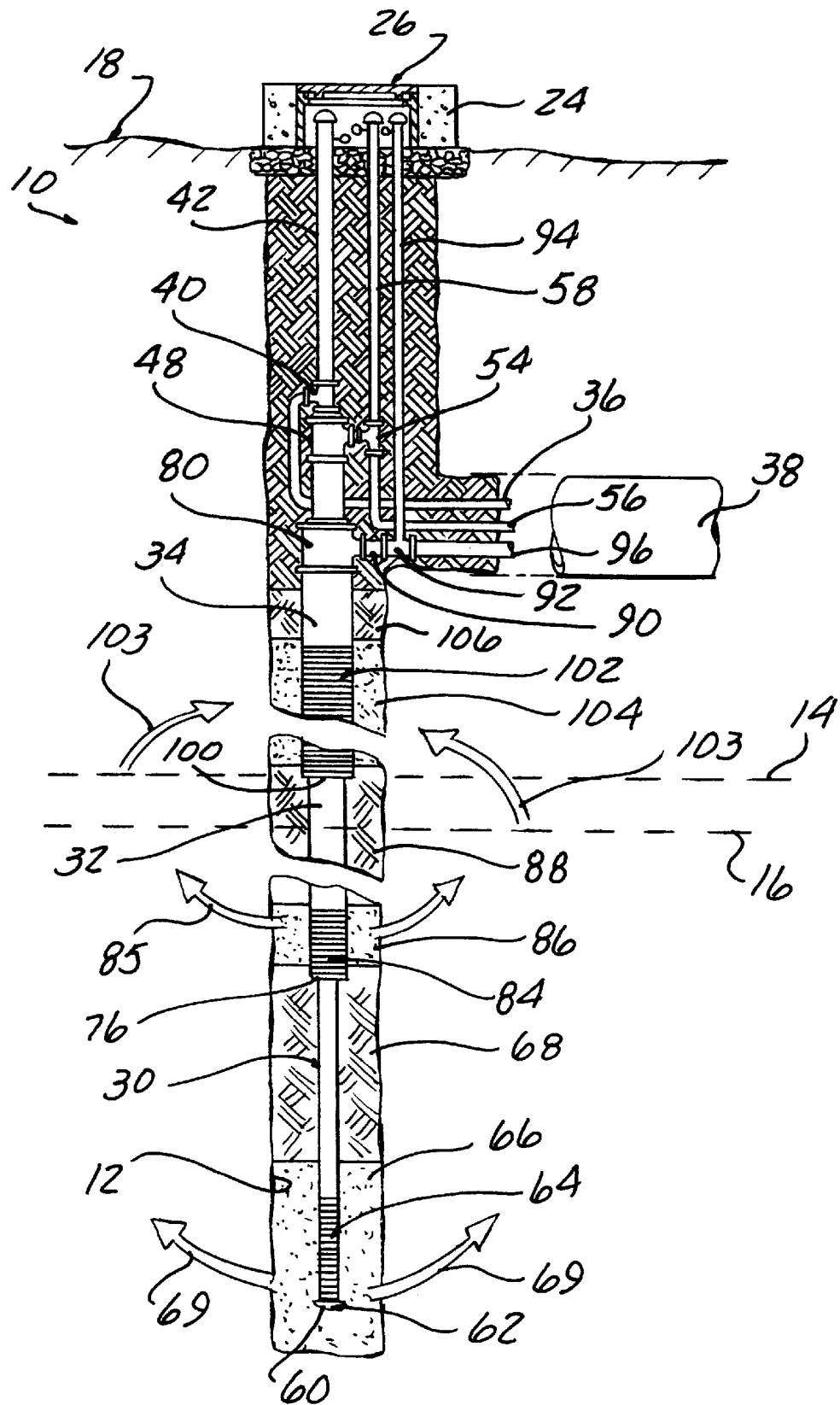
FIG. 2 is a side elevational view of the air sparging/soil vapor extraction apparatus of the present invention.
Figure 3:
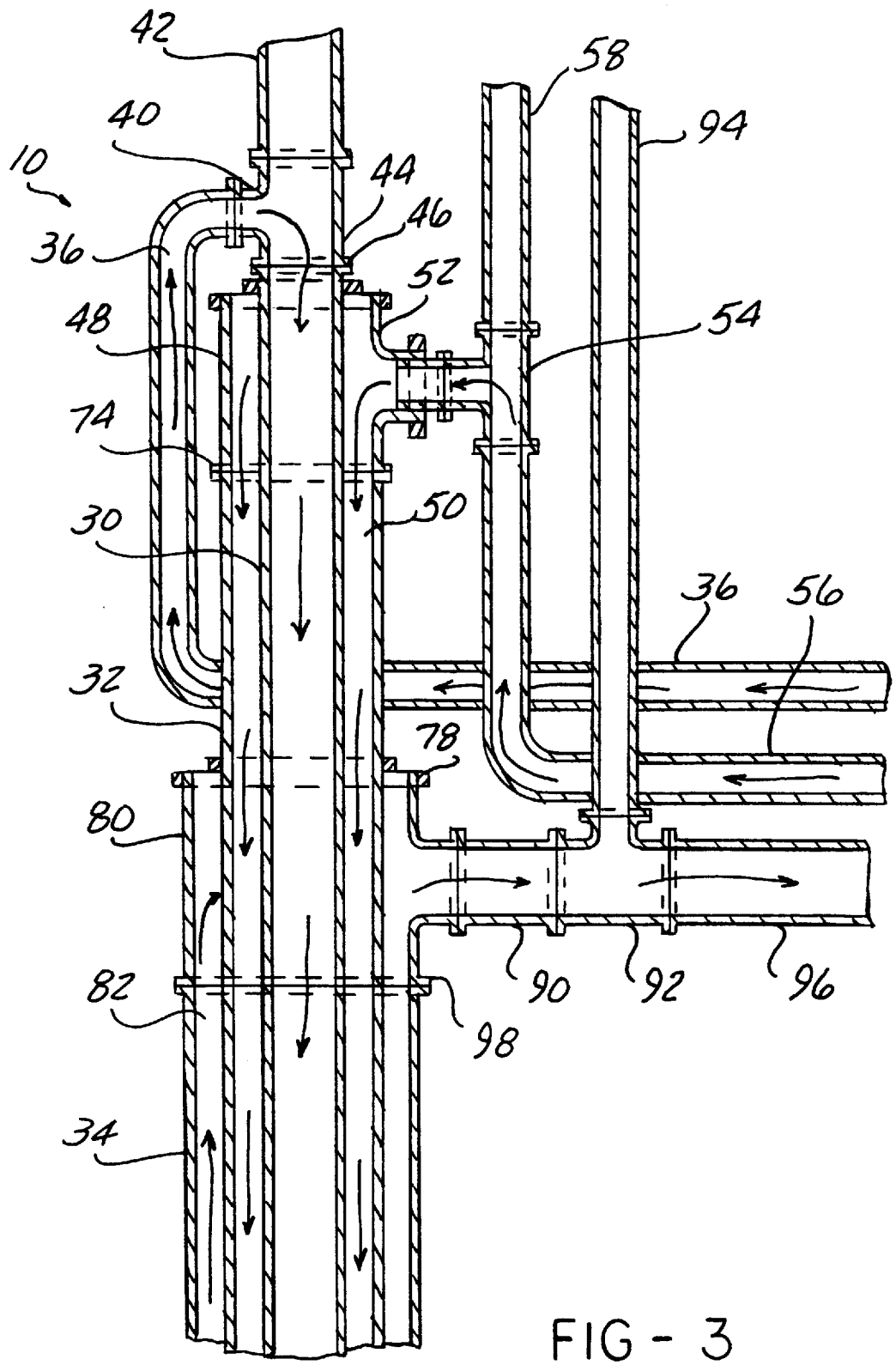
FIG. 3 is an enlarged, longitudinal cross-sectional view depicting a portion of the apparatus shown in FIG. 2.

Referring now to the drawing, and to FIGS. 1–3 in particular, there is depicted an air sparging/soil vapor extraction apparatus denoted generally by reference number 10. The apparatus 10 is positionable in a single bore hole 12 which extends through the lower, non-moist, saturated soil, a capillary or fringe layer, the upper lever of the water table; and deep into an area of soil which is heavily contaminated. The contaminants typically found in soil and ground water are typically hydrocarbons, chlorinated compounds, etc. Due to the density of hydrocarbons and other chlorinated elements, different contaminants settle or accumulate at different depths below the soil surface 18, some below and some above the water table 16. For example, hydrocarbons, such as benzene, ethylene, toluene, zylene, etc., have a lower density than chlorinated elements and typically float above the water table 16 as shown in FIG. 1. The chlorinated elements, such as trichloroethylene (TCE), are much denser and typically settle below the water table 16.

Thus, according to the present invention, the bore hole 12 is formed to extend through an upper contaminated area 20 above the water table 16 and deep into a lower or second contaminated area 22 below the water table 16.

Generally, as shown in FIG. 2, after the apparatus 10 is centered within the bore hole 12, alternating layers of a filtering and seal media, such as filter pack sand and a seal material, such as Bentonite, are placed in the bore hole 12 up to a main connection end of the apparatus 10. Native backfill is then placed in the bore hole 12 to surround the uppermost portions of the apparatus 10 as also shown in FIG. 2.

A surface enclosure 24 is provided above the apparatus 10 in the bore hole 12. The enclosure 24, which typically is formed of a concrete collar surrounding an internal cavity, has a removable cover 26 which allows access to pressure and vacuum gauges mounted within the enclosure 24 and connected in fluid communication by pipes, as described hereafter, to various portions of the apparatus 10.

In general, the air sparging/soil vapor extraction apparatus 10 is formed of three concentric conduits or pipes, such as a first, inner, long length conduit or pipe 30, a second, intermediate, shorter length pipe or conduit 32 which is concentrically arranged about the first pipe 30, and a third, even shorter length pipe or conduit 34 which is concentrically disposed about an upper end portion of the second pipe 32.

As shown in FIGS. 2 and 3, a first pressurized gaseous fluid supply pipe 36 is disposed below the soil surface 18 and connected at one end to a fluid pressure source, such as a conventional blower, not shown. The pipe 36 is disposed within an outer shield or pipe 38. By example only, the first pipe 36 is formed of one inch diameter Vardex tubing. One end of the first supply pipe 36 is sealingly connected to a reducing tee 40. By example, the reducing tee 40 is a 2"×2"×1" tee. A gauge pipe 42 is connected to one end of the tee 40 and extends upward to an upper end located within the surface enclosure 24. A pressure gauge is connected to the gauge pipe 42 to provide an indication of the pressure of the gas flowing through the first supply pipe 36 and the first inner pipe 30.

The first or inner pipe 30 is sealingly mounted in another part of the reducing tee 40 as shown in FIG. 3. The first end 44 of the first pipe 30 extends through an annular cap 46 which is mounted in one end of the reducing tee 40 and seats within a second, larger reducing tee 48, such as a 4"×4"×2" tee. The cap 46 centers the first pipe 30 within the larger diameter second reducing tee 48 and provide an annular space 50 between the exterior of the first pipe 30 and the inner surface of the reducing tee 48.

The second reducing tee 48 has an inlet end 52 which is connected to a tee 54. The tee 54 has an inlet connected to a second pressurized gaseous fluid supply pipe 56 which is connected at an opposite end to a pressurizing fluid source, such as a conventional blower, not shown. Another end or port of the tee 54 is connected to a second gauge pipe 58 which extends to an upper end in the surface enclosure 24. A pressure gauge is connected to the upper end of the second gauge pipe 58 to provide an indication of the pressure of the gaseous fluid flowing through the second supply pipe 56.

The first pipe 30 extends through the second reducing tee 48 for a length sufficient to position the second end 60 of the first pipe 30 deep within the second contaminated area 22 within the soil. As shown in FIG. 2, a cap 62 closes the second 60 of the first pipe 30. Further, approximately one foot from the second end 60 of the first pipe 30, a screen 64 is provided to allow the discharge of pressurized fluid from the second end of the first pipe 30. The screen 64 is formed of a slotted pipe joined to one end of the first pipe 30 or integrally formed as a part of the first pipe 30. The number and position of the slots in the screen 64 are conventional and are selected to prevent the substantial inflow of the filter pack sand which is disposed in a first layer 66 about the screen 64. As shown in FIG. 2, a layer of Bentonite seal material 68 is disposed above the first filter layer 66 and surrounds the solid portion of the first pipe 30.

Referring again to FIG. 1, the position of the second end of the first pipe 30 deep within the second contaminated layer 22 enables the discharge of air injected to the first pipe 30 out of screen 64 of the first pipe 30 in the second contaminated layer 22. This results in an upward flow shown by the arrows 69 in FIGS. 1 and 2 of the pressurized air through the second contaminated layer 22. Whereby the air volatizes and removes contaminants from the soil.

The first end 74 of the second pipe 32 is sealingly mounted in one outlet of reducing tee 48 as shown in FIG. 3. Since the cap 46 centers the first pipe 30 within the reducing tee 48, the annular space 50 is also formed between the outer surface of the first pipe 30 and the inner surface of the second pipe 32. The second pipe 32 has a length to position the second end 76 immediately below the water table 16 as shown in FIGS. 1 and 2. The second pipe 32 passes through a second cap 78 which is mounted in the one port of a third reducing tee 80 which, in a preferred example, is a 6"×6"×2" tee. The cap 78 centers the second pipe 30 within the third reducing tee 80 and forms an annular space about the periphery of the second pipe 32 and the inner surface of the side wall of the reducing tee 80.

As with the first pipe 30, the second end 76 of the second pipe 32 is closed by means of a cap which has a cap, not shown, which has a central aperture allowing the passage of the first pipe 30 therethrough. Immediately adjacent the second end 76 of the second pipe 32, a screen 84 is formed either as a slotted conduit connected to the end of the second pipe 32 or as an integral part of the second conduit 32. The screen 84 enables the discharge of pressurized fluid from the second pipe 32 into the surrounding soil as shown by the arrows 85 in FIGS. 1 and 2.

As shown in FIG. 2, a second layer 86 of #30 filter pack sand is disposed about the screen 84. The remaining exposed portion of the second pipe 32 is surrounded by a Bentonite seal layer 88.

A short connector pipe 90 is mounted in another port of the reducing tee 80 and is attached, at another end, to a tee 92. The tee 92 receives one end of an auxiliary gauge pipe 94 which extends to an upper end located in the surface closure 24. A vacuum gauge connected to the upper end of the auxiliary gauge pipe 94 to provide an indication of the degree of vacuum within the auxiliary pipe 94.

Another port on the tee 92 is connected to a pipe 96, preferably two-inch PVC pipe. The pipe 96 is thus disposed in fluid communication with the interior space 82 between the exterior of the second pipe 32 and the interior of the reducing tee 80. The pipe 96 extends through the surrounding conduit 38 along with the fluid supply pipes 36 and 56 and is connected to a blower, not shown, which generates a low pressure or vacuum within the pipe 96 sufficient to draw gasses from the space 82 to the pipe 96. One end 98 of the third pipe 34 is seated in another port of the reducing tee 80 as shown in FIG. 3. This concentrically positions the third pipe 34 around the second pipe 32 and provides the annular space 82 therebetween.

As shown in FIG. 2, a second end 100 of the third pipe 34 is closed by means of a cap. Immediately adjacent the second end 100 of the third pipe 34, a slotted screen 102 is formed as an integral part of the third pipe 34 or as an additional screen conduit attached to the third pipe 34. A third layer 104 of #30 filter pack sand is disposed about the screen 102. A third seal layer 106, preferably of Bentonite seal material, is disposed about the remaining exposed portions of the third pipe 34 as shown in FIG. 2.

Although not shown, a conventional air supply and contaminant processing facility is mounted on the surface 18 in the area of the bore hole 12. The facility draws in outside air to two blowers which generate pressurized air flow streams through the separate supply pipes 36 and 56 to the first and second pipes 30 and 32, respectively. This enables different gas pressures to be provided in the first and second pipes 30 and 32, if desired. A vacuum blower is also provided in the processing facility to create a low pressure or vacuum of the extraction pipe 96. Also connected to the end of the extraction pipe 96 is a conventional condensate separator and at least one and preferably two alternatingly used carbon vessels which filter and remove the contaminants entrained in the air extracted from the contaminated area.

In operation, after the apparatus 10 has been positioned in the bore hole 12, the alternating layers 66, 86 and 104 of filter pack sand and the layers 68, 88 and 106 of Bentonite seal material are placed around the first, second and third pipes 30, 32 and 34 shown in FIG. 2. The auxiliary gauge pipes 42, 58 and 94 and the supply pipes 36 and 56 and the extraction pipe 96 are then surrounded by backfill. The air supply is activated to supply pressurized air through the supply pipes 36 and 56 respectively to the first and second pipes 30 and 32, respectively. Although the pressure of the air flows through the first and second pipes 36 and 56 may be equal, it is preferred that the pressure of air flowing through the auxiliary pipe 36 and the first pipe 30 be higher than the pressure of the air flowing through the second pipe 32.

Air is simultaneously discharged through the screens 64 and 84 at the second ends of the first and second pipes 30 and 32, respectively, generating outward air flow paths directions of the arrows 69 and 85 shown in FIGS. 1 and 2. In this manner, simultaneous volatization of contaminants in the soil takes place at a low level adjacent the second end of the first pipe 30 and at an upper level immediately below the water table 16 adjacent the second end of the second pipe 32.

Due to the concentric arrangement of the discharge ends of the first and second pipes 30 and 32, and the low pressure flow created through the second end of the third pipe 34, substantially all of the air discharged through the second ends of the first and second pipes 30 and 32 is collected in the second end of the third pipe 34 as shown by the arrows 103 in FIGS. 1 and 2, and removed from the bore hole 12.

In summary, there has been disclosed a unique air sparging/soil vapor extraction apparatus and method which provides a higher efficiency in removing greater quantities of contaminants in less time than previously devised air sparging and/or soil vapor extraction apparatus. The present apparatus also employs only a single bore hole for both air sparging and soil vapor extraction operations thereby reducing overall soil and groundwater remediation costs while achieving the desired high efficiency contaminant removal since substantially all of the air discharged from the first and second pipes is collected by the third pipe.

What is claimed is:

1. An apparatus for removing volatile contaminants from soil and groundwater, the apparatus mounted in a single bore hole in soil, the apparatus comprising:

first, second and third concentric pipes, each having first and second ends;

the first pipe extending a first length to the second end, the first end connected to a pressurized gas source for the discharge of pressurized gas from the second end of the first pipe;

the second pipe concentrically surrounding the first pipe and extending a second length to the second end, the second length being less than the first length of the first pipe, the first end of the second pipe connected to a pressurized gas source for the discharge of pressurized gas from the second end of the second pipe; and the third pipe concentrically surrounding the second pipe and extending a third length to the second end, the third length being less than the second length of the second pipe, the first end of the third pipe connected to a low pressure source to extract air from the bore hole and soil immediately surrounding the bore hole.

2. The apparatus of claim 1 wherein the second pipe has a length to position the second end of the second pipe immediately below the water table level in a bore hole.

3. The apparatus of claim 1 wherein the length of the third pipe positions the second end of the third pipe above the water table level in the bore hole.

4. The apparatus of claim 1 further comprising:

a first cap closing the second end of the first pipe; and a second cap closing the second end of the second pipe, the second cap having an aperture allowing the first pipe to pass through the second cap.

5. The apparatus of claim 1 further comprising:
a third cap closing the second end of the third pipe, the third cap having an aperture allowing the second pipe to pass through the third cap.

6. The apparatus of claim 1 further comprising:
first means for spacing the first pipe from the second pipe; and
second means for spacing the second pipe from the third pipe.

7. The apparatus of claim 6 wherein:
the first spacing means centers the first pipe concentrically within the second pipe; and
the second spacing means centers the second pipe concentrically within the third pipe.

8. A method of remediating soil and groundwater of volatile contaminants, the method comprising the steps of:
forming a single bore hole through the water table in soil;
disposing a first pipe having first and second ends in the bore hole;
connecting the first end of the first pipe to a source of pressurized gas;
forming apertures adjacent the second end of the first pipe for discharging pressurized gas from the first pipe at a first depth in the bore hole;
disposing a second pipe having first and second ends about the first pipe;
connecting the first end of the second pipe to a source of pressurized fluid;
forming apertures adjacent the second end of the second pipe for discharging pressurized fluid from the second pipe at a second depth in the bore hole, the second depth being less than the first depth of the second end of the first pipe;
disposing a third pipe having first and second ends about the second pipe; and
connecting a first end of the third pipe to a low pressure source to extract air from the soil immediately surrounding the bore hole and discharged from the second ends of the first and second pipes through the second end of the third pipe, the second end of the third pipe disposed at a shallower depth in the bore hole than the depth of the second end of the second pipe.

9. The method of claim 8 further comprising the step of:
injecting pressurized fluid in the first pipe at a higher pressure than the pressure of the pressurized fluid injected into the second pipe.

10. The method of claim 8 further comprising the step of:
forming a length of the second pipe to position the second end of the second pipe for the discharge of gas from the second end of the second pipe immediately below the water table level in the soil.

11. The method of claim 10 further comprising the step of:
forming a length of the first pipe to position the second end of the first pipe further below the water table level.

12. The method of claim 11 further comprising the step of:
forming a length of the third pipe to position the second end of the third pipe above the water table level.

* * * * *